United States Patent
Lee et al.

(10) Patent No.: US 9,867,105 B2
(45) Date of Patent: Jan. 9, 2018

(54) METHOD AND APPARATUS FOR TRANSMITTING MESSAGE IN WIRELESS COMMUNICATION SYSTEM

(71) Applicant: LG ELECTRONICS INC., Seoul (KR)

(72) Inventors: Youngdae Lee, Anyang-si (KR); Sungjun Park, Anyang-si (KR); Seungjune Yi, Anyang-si (KR); Sunghoon Jung, Anyang-si (KR); Jaewook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 14/399,862

(22) PCT Filed: May 8, 2013

(86) PCT No.: PCT/KR2013/004035
§ 371 (c)(1),
(2) Date: Nov. 7, 2014

(87) PCT Pub. No.: WO2013/169006
PCT Pub. Date: Nov. 14, 2013

(65) Prior Publication Data
US 2015/0111578 A1 Apr. 23, 2015

Related U.S. Application Data

(60) Provisional application No. 61/644,395, filed on May 8, 2012.

(51) Int. Cl.
*H04W 36/24* (2009.01)
*H04W 36/00* (2009.01)
*H04W 36/08* (2009.01)

(52) U.S. Cl.
CPC ....... *H04W 36/24* (2013.01); *H04W 36/0061* (2013.01); *H04W 36/08* (2013.01)

(58) Field of Classification Search
CPC . H04W 36/24; H04W 36/0061; H04W 36/08; H04W 36/34–36/365; H04W 72/082; H04W 72/1226; H04W 36/20; H04W 40/16; H04W 28/048; H04W 28/248; H04W 28/0236; H04W 52/0238;
(Continued)

(56) References Cited

U.S. PATENT DOCUMENTS 8,566,455 B1 * 10/2013 Zhao .................... H04W 76/025
709/227
9,258,833 B2 * 2/2016 Bitran .................... H04W 16/14
(Continued)

FOREIGN PATENT DOCUMENTS

WO   WO 2006/031055 A1   3/2006
WO   WO 2011/019083 A1   2/2011
WO   WO 2012/050336 A1   4/2012

*Primary Examiner* — Mehmood B Khan
(74) *Attorney, Agent, or Firm* — Birch, Stewart, Kolasch & Birch, LLP

(57) ABSTRACT

A method and apparatus for transmitting a message in a wireless communication system is provided. A user equipment (UE) determines that a first cell, serving the UE currently, is not preferred, and transmits a message, to the first cell, including a request for a handover from the first cell to a second cell.

2 Claims, 12 Drawing Sheets

(58) Field of Classification Search
CPC . H04W 52/24; H04W 52/244; H04J 11/0023; H04J 11/0026; H04J 11/005–11/0059
See application file for complete search history.

(56) References Cited

U.S. PATENT DOCUMENTS

| | | | | |
|---|---|---|---|---|
| 9,344,944 | B2* | 5/2016 | Jung | H04W 36/30 |
| 9,544,822 | B2* | 1/2017 | Dudda | H04W 36/0005 |
| 2006/0058047 | A1* | 3/2006 | Jeong | H04W 36/0055 455/464 |
| 2009/0046656 | A1 | 2/2009 | Kitazoe et al. | |
| 2009/0265543 | A1* | 10/2009 | Khetawat | H04W 12/08 713/151 |
| 2010/0110945 | A1* | 5/2010 | Koskela | H04W 48/20 370/310 |
| 2010/0189075 | A1* | 7/2010 | Iwamura | H04W 36/0055 370/331 |
| 2010/0323633 | A1* | 12/2010 | Pani | H04W 24/10 455/67.14 |
| 2011/0143738 | A1* | 6/2011 | Kone | H04W 48/16 455/418 |
| 2011/0170481 | A1* | 7/2011 | Gomes | H04W 36/0083 370/328 |
| 2011/0294508 | A1* | 12/2011 | Min | H04W 76/028 455/436 |
| 2011/0300807 | A1* | 12/2011 | Kwun | H04W 24/10 455/63.1 |
| 2012/0040620 | A1* | 2/2012 | Fu | H04B 1/1027 455/63.1 |
| 2012/0069766 | A1* | 3/2012 | Fu | H04B 1/406 370/252 |
| 2012/0106349 | A1* | 5/2012 | Adjakple | H04W 52/0206 370/241 |
| 2012/0106423 | A1* | 5/2012 | Nylander | H04W 52/0241 370/311 |
| 2012/0135739 | A1* | 5/2012 | Paterson | C07K 14/195 455/436 |
| 2012/0196593 | A1* | 8/2012 | Jung | H04W 48/10 455/434 |
| 2012/0207038 | A1* | 8/2012 | Choi | H04W 16/14 370/252 |
| 2012/0213162 | A1* | 8/2012 | Koo | H04W 16/14 370/329 |
| 2012/0246325 | A1* | 9/2012 | Pancorbo Marcos | H04L 63/102 709/227 |
| 2012/0276936 | A1* | 11/2012 | Ahn | H04W 76/028 455/501 |
| 2013/0003697 | A1* | 1/2013 | Adjakple | H04W 36/0011 370/331 |
| 2013/0013797 | A1* | 1/2013 | Henttonen | H04W 4/00 709/229 |
| 2013/0064226 | A1* | 3/2013 | Dinan | H04W 36/30 370/332 |
| 2013/0208641 | A1* | 8/2013 | Baghel | H04B 1/109 370/311 |
| 2013/0231115 | A1* | 9/2013 | Lin | H04W 36/0083 455/436 |
| 2013/0279423 | A1* | 10/2013 | Ahn | H04W 72/1215 370/328 |
| 2013/0281096 | A1* | 10/2013 | Baghel | H04W 28/048 455/436 |
| 2013/0315194 | A1* | 11/2013 | Ahn | H04W 72/082 370/329 |
| 2013/0324172 | A1* | 12/2013 | Ahn | H04W 36/0094 455/501 |
| 2013/0336281 | A1* | 12/2013 | Ahn | H04W 72/082 370/330 |
| 2014/0051443 | A1* | 2/2014 | Diachina | H04W 36/0022 455/436 |
| 2014/0295905 | A1* | 10/2014 | Koskinen | H04W 52/0206 455/522 |
| 2014/0341059 | A1* | 11/2014 | Jang | H04W 48/06 370/252 |
| 2014/0362691 | A1* | 12/2014 | Lei | H04W 48/18 370/230 |
| 2015/0072687 | A1* | 3/2015 | Hong | H04W 36/30 455/436 |
| 2015/0087343 | A1* | 3/2015 | Lee | H04W 24/02 455/466 |
| 2015/0289181 | A1* | 10/2015 | Bromell | H04W 24/10 455/436 |

* cited by examiner

[Fig. 1]
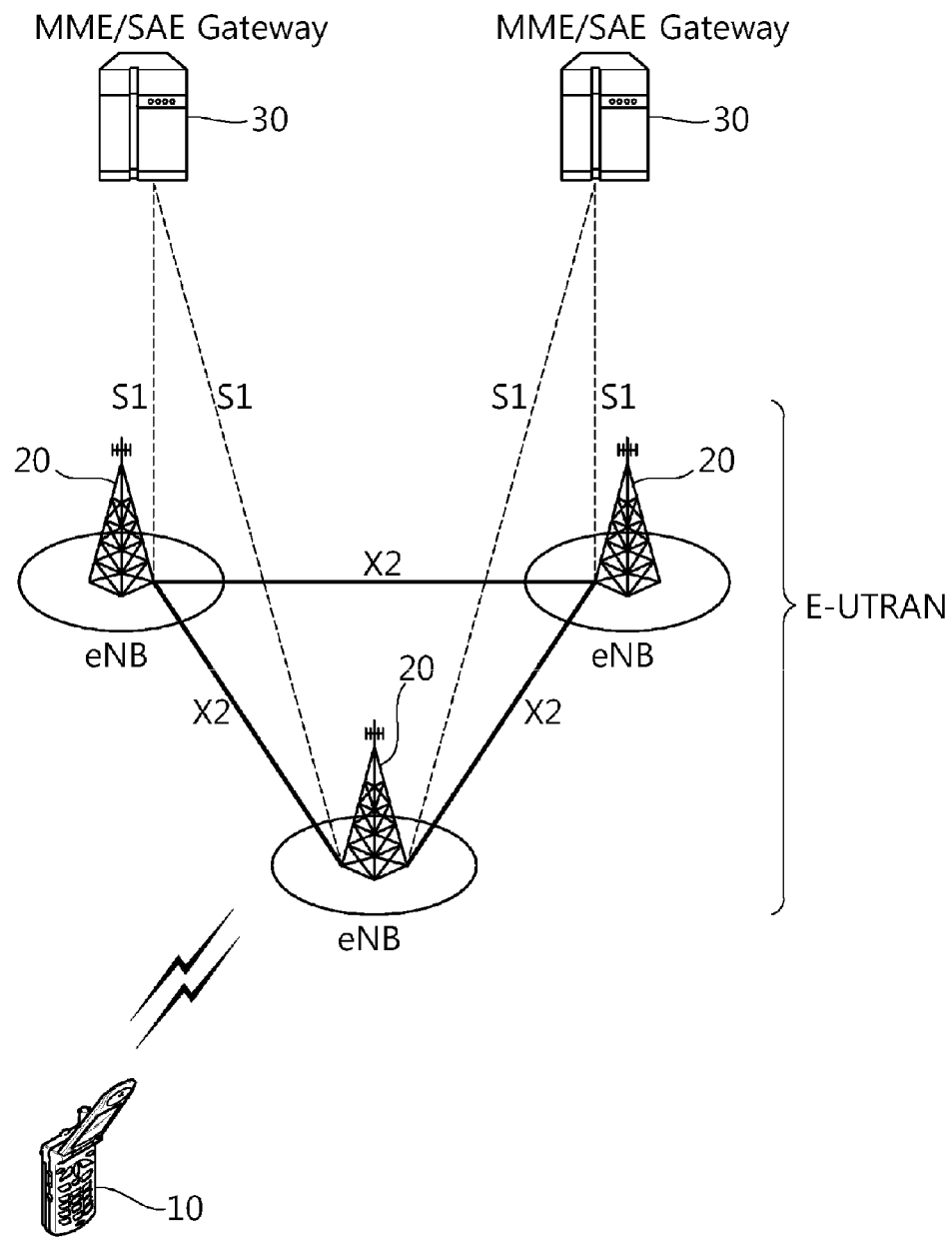

[Fig. 2]
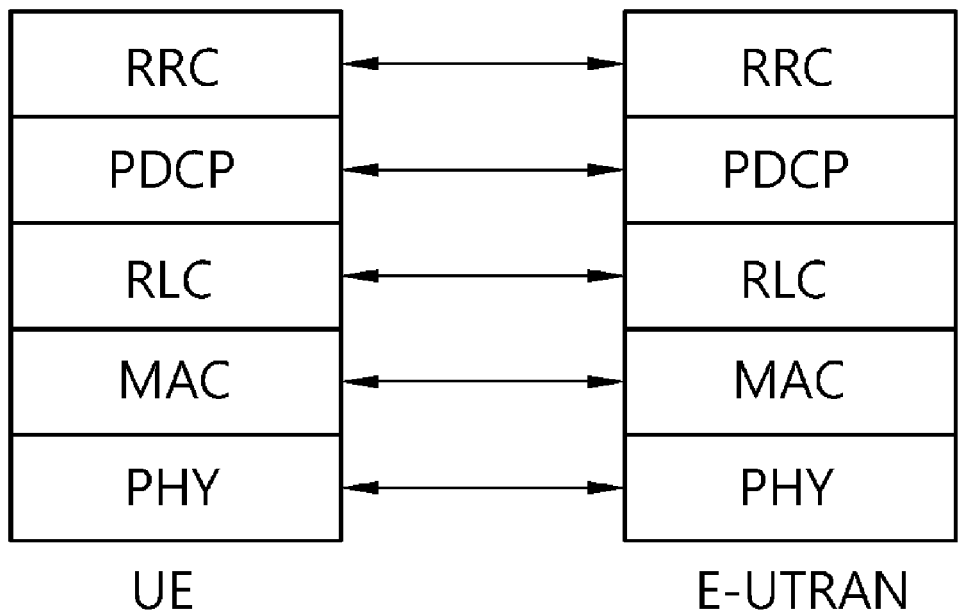
[Fig. 3]
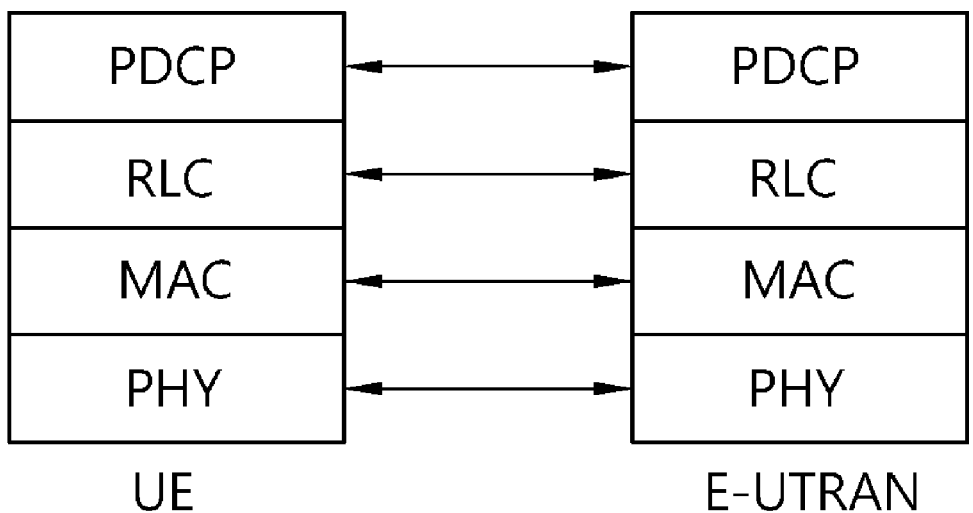

[Fig. 4]
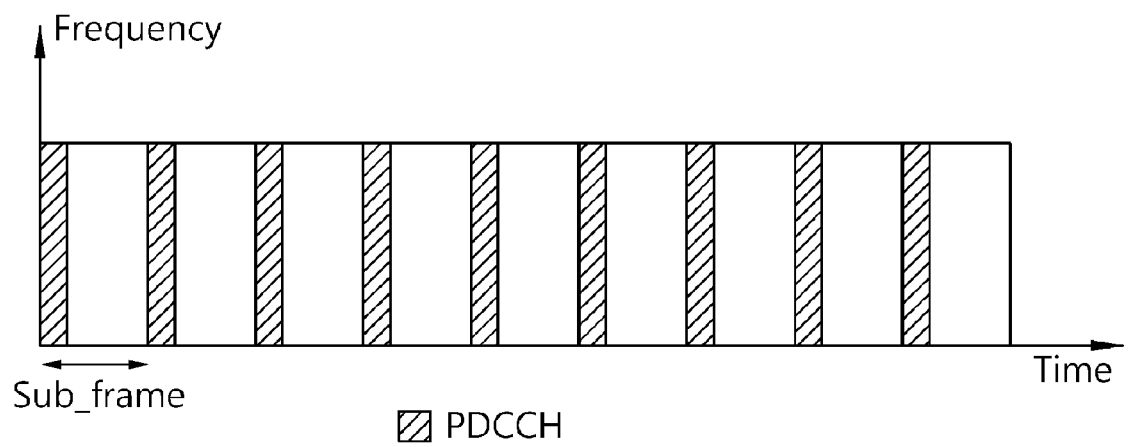

[Fig. 5]
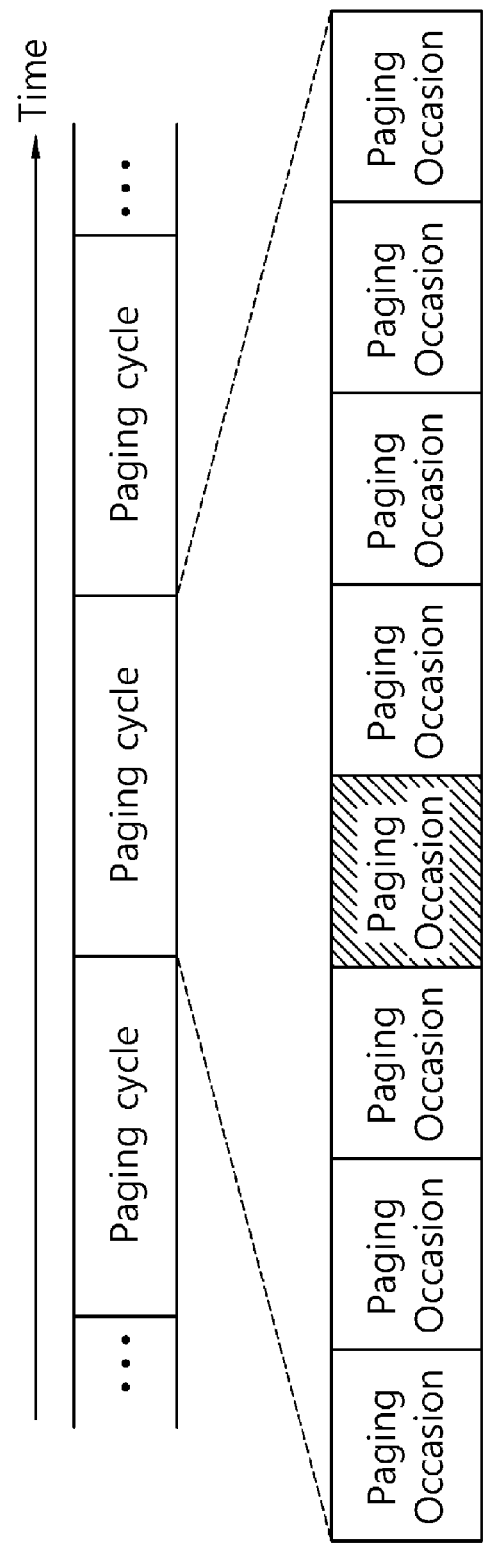

[Fig. 6]
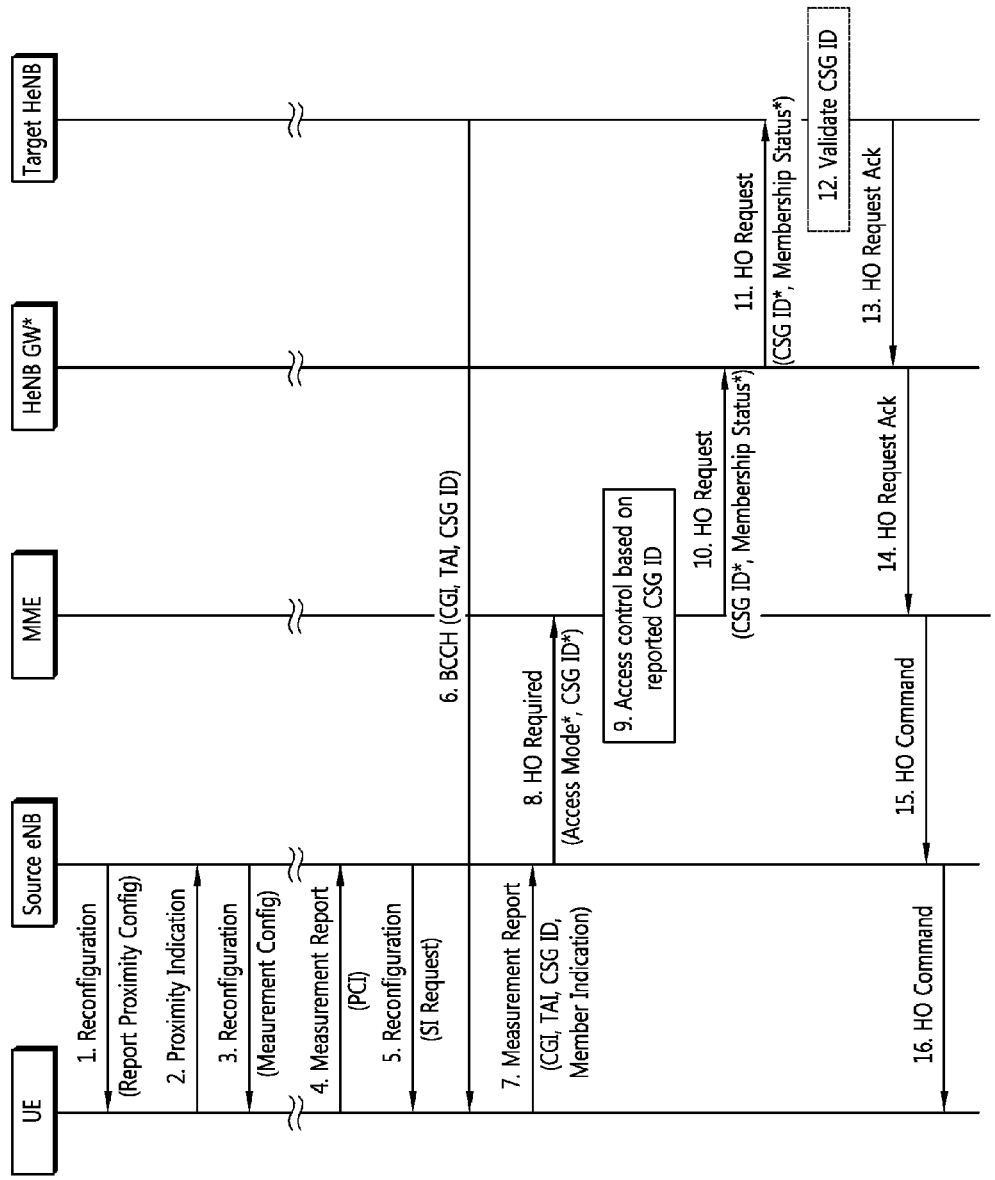

[Fig. 7]
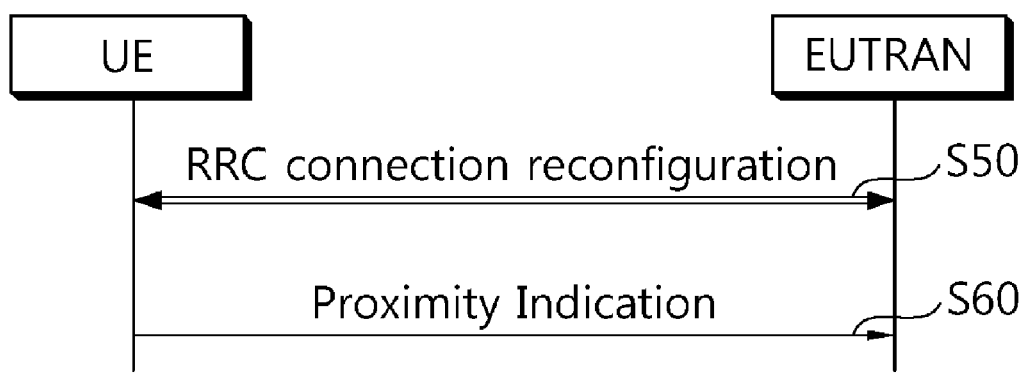

[Fig. 8]
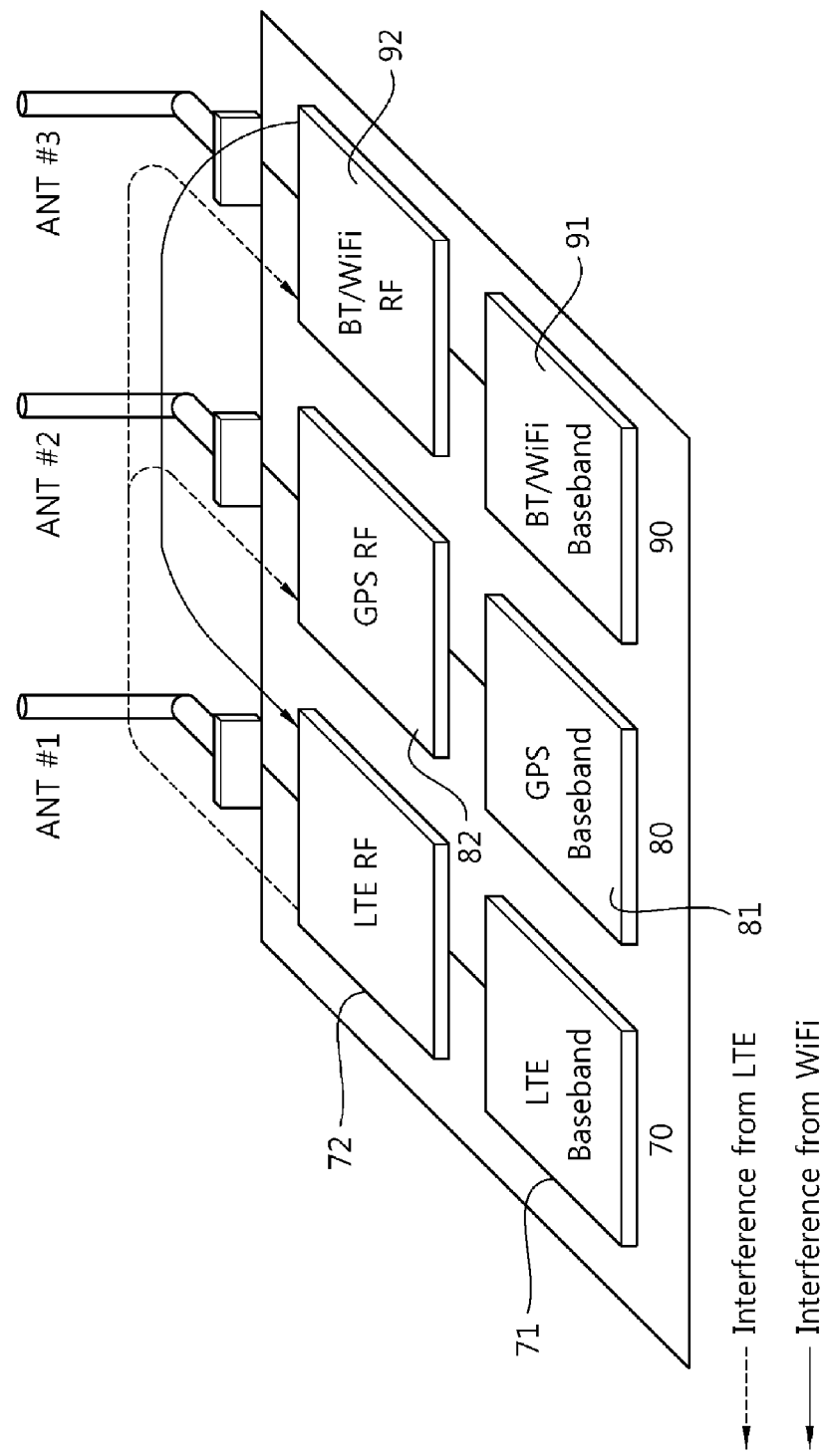

[Fig. 9]
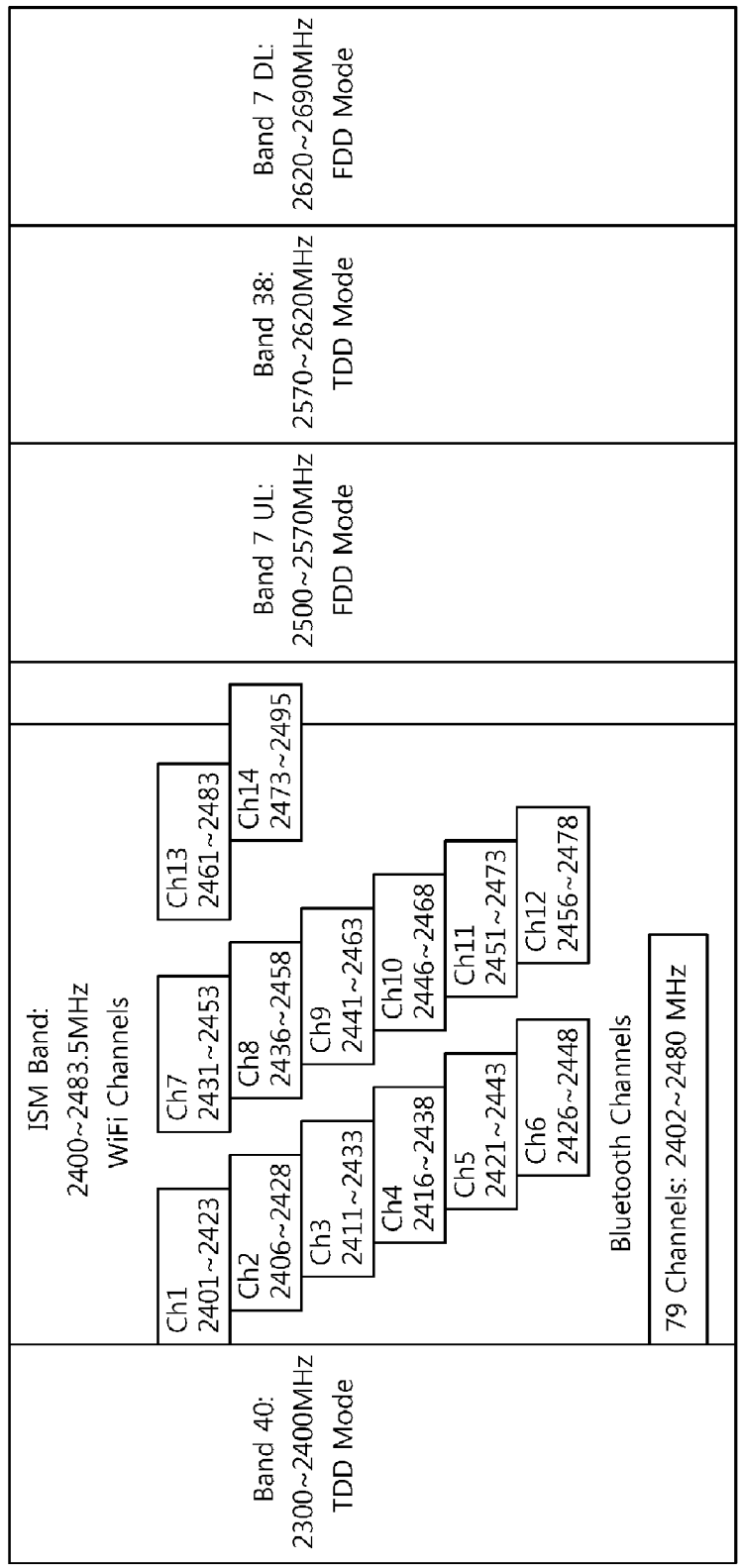

[Fig. 10]
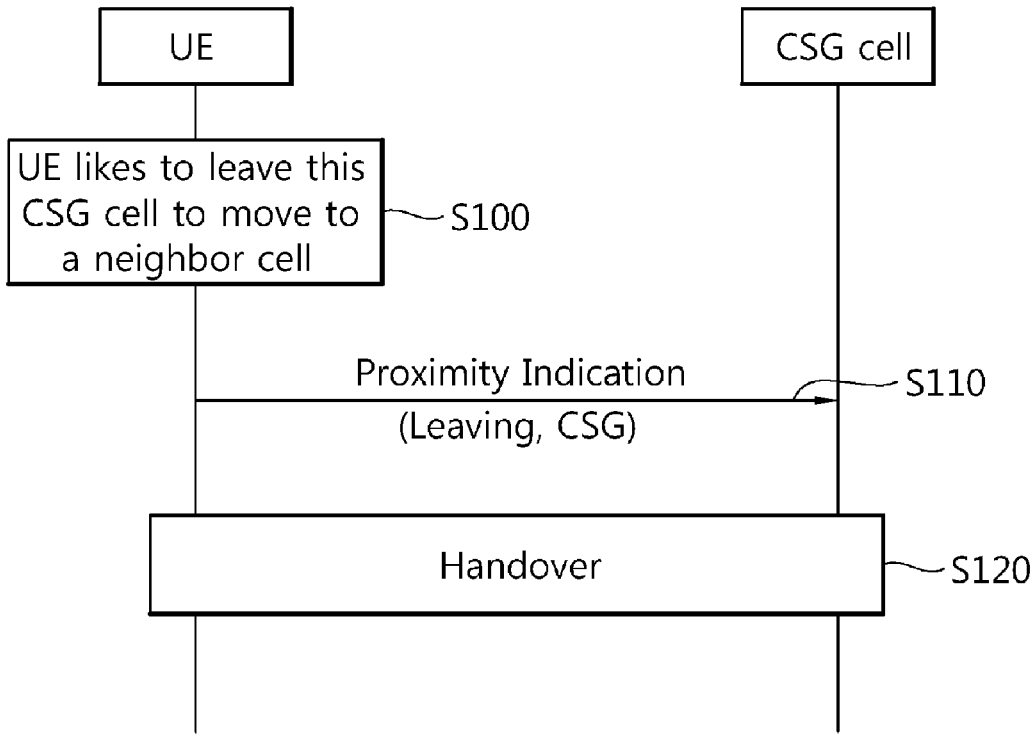
[Fig. 11]
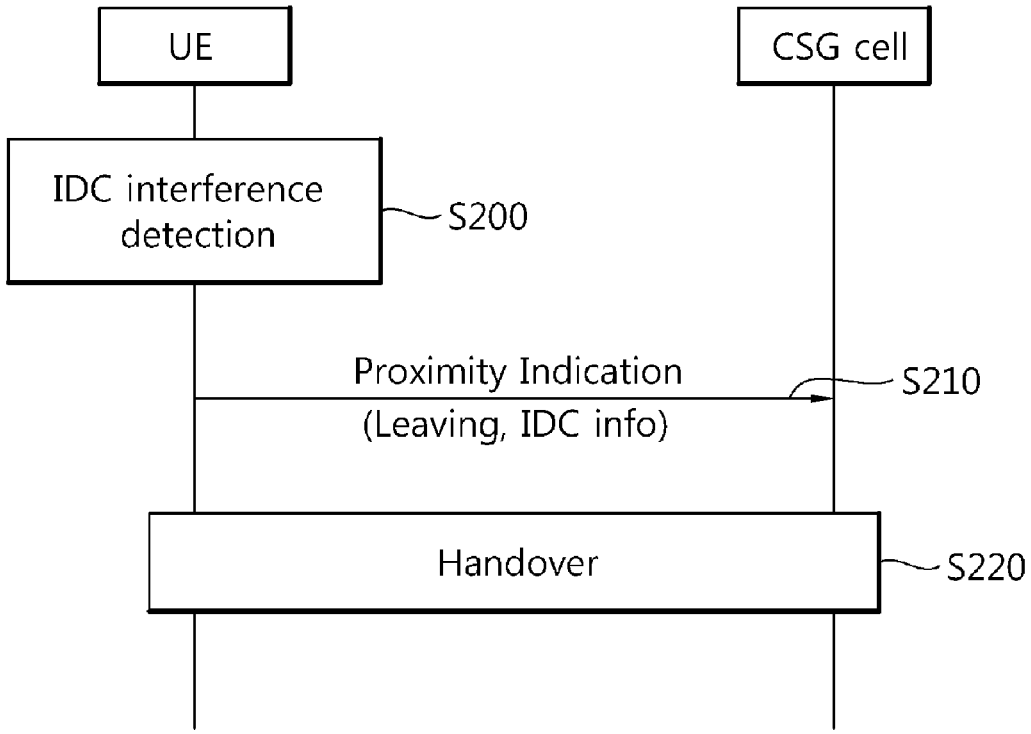

[Fig. 12]
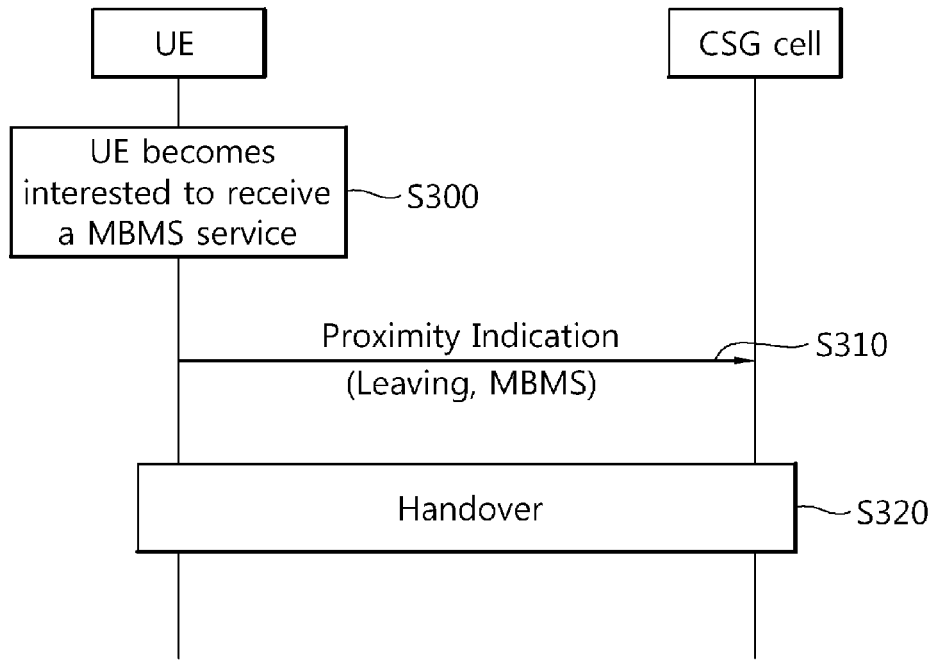
[Fig. 13]
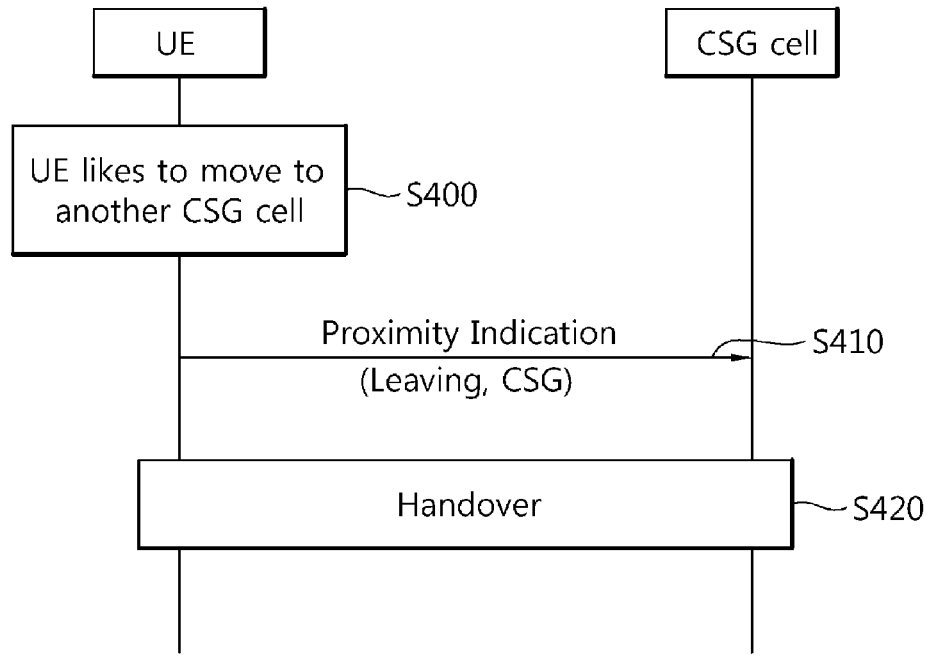

[Fig. 14]
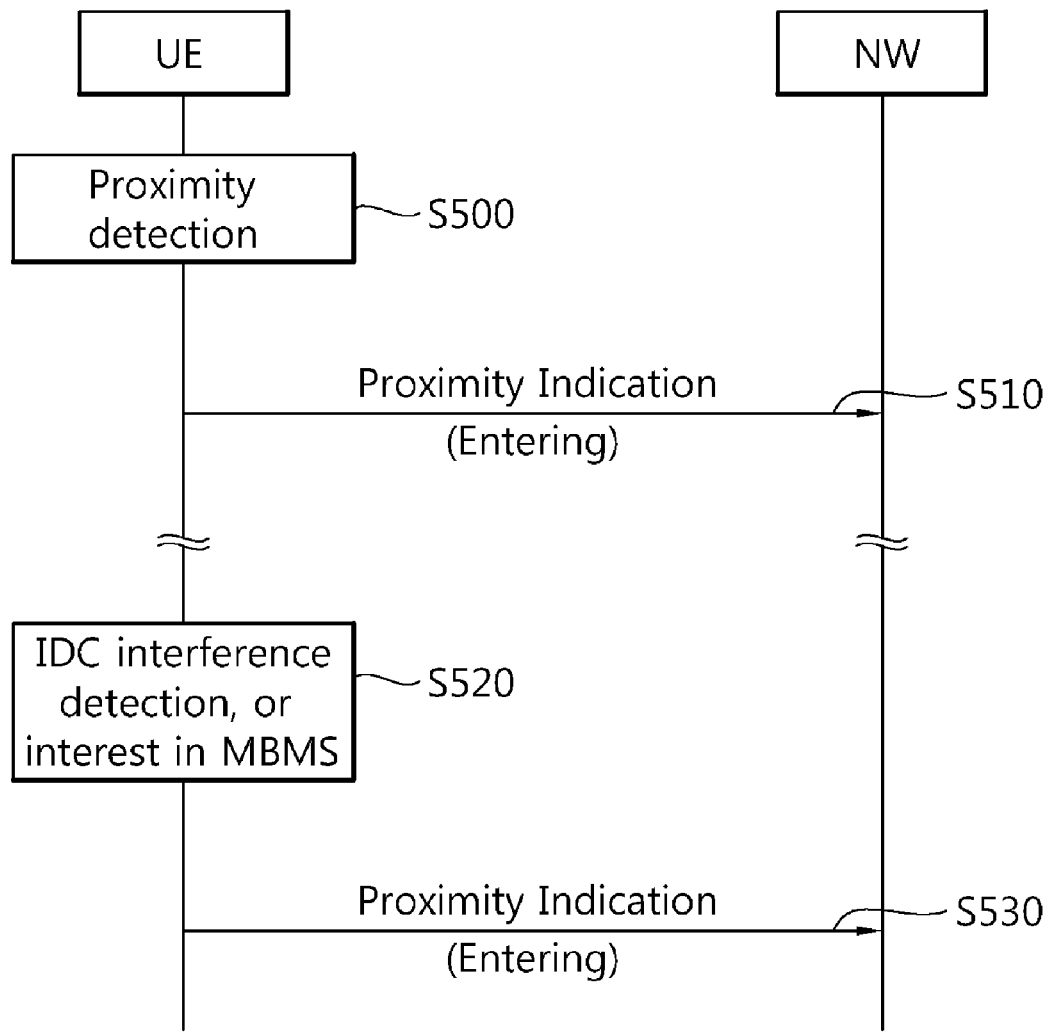

[Fig. 15]
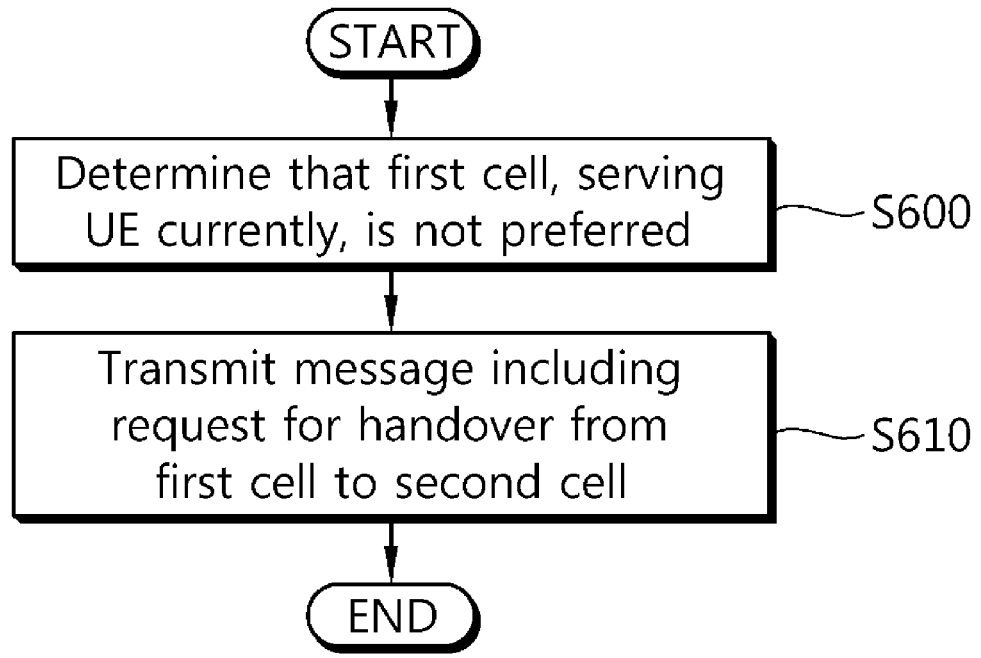
[Fig. 16]
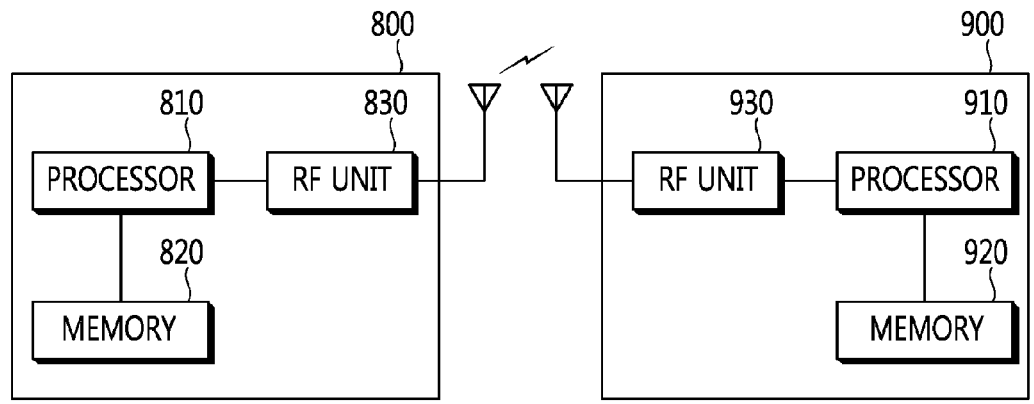

METHOD AND APPARATUS FOR TRANSMITTING MESSAGE IN WIRELESS COMMUNICATION SYSTEM

CROSS REFERENCE TO RELATED APPLICATIONS

This application is the National Phase of PCT/KR2013/004035 filed on May 8, 2013, which claims priority under 35 U.S.C. 119(e) to U.S. Provisional Application No. 61/644,395 filed on May 8, 2012, all of which are incorporated by reference herein in its entirety.

TECHNICAL FIELD

The present invention relates to wireless communications, and more particularly, to a method and apparatus for transmitting a message in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

A closed subscriber group (CSG) identifies subscribers of an operator who are permitted to access one or more cells but which have restricted access (CSG cells). A CSG cell broadcasts a CSG indicator set to true and a specific CSG identity. A CSG whitelist is a list stored in a UE containing CSG identities of the CSG cells to which the subscriber belongs.

Due to an in-device industrial, scientific and medical (ISM) transmitter, a 3GPP LTE radio can be interfered in case that the 3GPP LTE radio and an ISM radio coexist within the same device operating in adjacent frequencies. It may be called as in-device coexistence (IDC) interference. For example, when the LTE radio is working on band 40 and the ISM radio such as wireless local area network (WLAN) is active in a same device at the same time, the LTE radio in Rx mode is interfered by the ISM transmitter. Also, the transmission of the LTE radio can interfere the reception of the ISM/GNSS (global navigation satellite system) radio.

The 3GPP LTE can provide a multimedia broadcast/multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

When a UE is served by a CSG cell, there is a situation that the UE does not prefer the current serving CSG cell due to the IDC interference and/or the MBMS service. Accordingly, a method for performing a handover from the current serving CSG cell when the UE does not prefer the current serving CSG cell is required.

SUMMARY OF INVENTION

Technical Problem

The present invention provides a method and apparatus for transmitting a message in a wireless communication system. The present invention provides a method for transmitting a message including a request for a handover from a current serving cell when a user equipment (UE) does not like the current serving cell.

Solution to Problem

In an aspect, a method for transmitting, by a user equipment (UE), a message in a wireless communication system is provided. The method includes determining that a first cell, serving the UE currently, is not preferred, and transmitting a message, to the first cell, including a request for a handover from the first cell to a second cell.

The first cell may be not preferred when the UE detects in-device coexistence (IDC) interference on a frequency of the first cell.

The first cell may be not preferred when the UE is interested to receive a preferred service not provided by the first cell.

The preferred service may be a multimedia broadcast/multicast service (MBMS) service.

The preferred service may be a voice service.

The first cell may be one of a closed subscriber group (CSG) cell, a small cell, a pico cell and a femto cell.

The first cell may be not preferred when the first cell is a CSG cell and the UE recognizes the second cell which is another CSG cell.

The first cell may be not preferred when the first cell and the second cell operate in different radio access technologies (RATs) and the RAT of the first cell is not preferred.

The message may be a proximity indication.

The proximity indication may indicate that the UE leaves a proximity of the first cell.

The message may include a cause corresponding to a reason why the UE transmits the message.

In another aspect, a user equipment (UE) in a wireless communication system is provided. The UE includes a radio frequency (RF) unit for transmitting or receiving a radio signal, and a processor coupled to the RF unit, and configured for determining that a first cell, serving the UE currently, is not preferred, and transmitting a message, to the first cell, including a request for a handover from the first cell to a second cell.

Advantageous Effects of Invention

A UE may perform a handover procedure from a current serving cell when the UE does not prefer the current serving cell.

BRIEF DESCRIPTION OF DRAWINGS

FIG. 1 shows a structure of a wireless communication system.

FIG. 2 is a diagram showing a radio interface protocol architecture for a control plane.

FIG. 3 is a diagram showing a radio interface protocol architecture for a user plane.

FIG. 4 shows an example of a physical channel structure.

FIG. 5 shows transmission of a paging channel.

FIG. 6 shows an example of mobility to HeNB's CSG and hybrid cells.

FIG. 7 shows an example of a proximity indication procedure.

FIG. 8 shows an example of coexistence interference within the same UE.

FIG. 9 shows 3GPP frequency bands around ISM band.

FIG. 10 shows an example of a method for transmitting a message according to an embodiment of the present invention.

FIG. 11 shows another example of a method for transmitting a message according to an embodiment of the present invention.

FIG. 12 shows another example of a method for transmitting a message according to an embodiment of the present invention.

FIG. 13 shows another example of a method for transmitting a message according to an embodiment of the present invention.

FIG. 14 shows another example of a method for transmitting a message according to an embodiment of the present invention.

FIG. 15 shows another example of a method for transmitting a message according to an embodiment of the present invention.

FIG. 16 is a block diagram showing wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED state has the RRC connection established with the E-UTRAN, the E-UTRAN can recognize the existence of the UE in the RRC_CONNECTED and can effectively control the UE. Meanwhile, the UE in the RRC_IDLE state cannot be recognized by the E-UTRAN, and a core network (CN) manages the UE in unit of a tracking area (TA) which is a larger area than a cell. That is, only the existence of the UE in the RRC_IDLE state is recognized in unit of a large area, and the UE must transition to the RRC_CONNECTED state to receive a typical mobile communication service such as voice or data communication.

When the user initially powers on the UE, the UE first searches for a proper cell and then remains in the RRC_IDLE state in the cell. When there is a need to establish an RRC connection, the UE which remains in the RRC_IDLE state may establish the RRC connection with the RRC of the E-UTRAN through an RRC connection procedure and then may transition to the RRC_CONNECTED state. The UE which remains in the RRC_IDLE state may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED state. To access the network, the UE may perform a process of registering to the network through an initial attach procedure. If the initial attach procedure is successfully performed, the UE and the MME may be in the EMM-REGISTERED state.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE state establishes an RRC connection with the E-UTRAN, the UE may be in the ECM-CONNECTED state. When the MME in the ECM-IDLE state establishes an S1 connection with the E-UTRAN, the MME may be in the ECM-CONNECTED state. When the UE is in the ECM-IDLE state, the E-UTRAN does not have information on the context of the UE. Therefore, the UE in the ECM-IDLE state can perform a UE-based mobility related procedure such as cell selection or cell reselection without having to receive a command of the network. If a location of the UE in the ECM-IDLE state becomes different from a location known to the network, the UE may report the location of the UE to the network through a tracking area update procedure. On the other hand, the mobility of the UE in the ECM-CONNECTED state may be managed by the command of the network.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

The system information is necessary information which must be known to the UE to access the network. The UE must entirely receive the system information before the network access, and must always have the latest system information. In addition, since the system information is information which must be known to all UEs in one cell, the BS may periodically transmit the system information.

The system information may include a master information block (MIB), a scheduling block (SB), a system information block (SIB), etc. The MIB may indicate a physical configuration (e.g., a bandwidth, etc.) of a corresponding cell. The SB may indicate transmission information of SIBs, for example, a transmission period of the SIBs. The SIB is a set of related system information. For example, a certain SIB may include only information of a neighbor cell, and another SIB may include only information of an uplink radio channel used by the UE.

The BS may transmit the paging message to the UE to report whether there is a change in the system information. In this case, the paging message may include a system information change indicator. If the paging message received according to the paging cycle includes the system information change indicator, the UE may receive the system information transmitted through a BCCH which is a logical channel.

An inbound mobility to closed subscriber group (CSG) cells is described. It may refer to a section 10.5.1 of 3GPP TS 36.300 V10.5.0 (2011-09).

First, an inbound mobility to CSG cells when a UE is in RRC_IDLE is described.

A cell selection/reselection to CSG cells is based on a UE autonomous search function. The search function determines itself when/where to search, and need not be assisted by a network with information about frequencies which are dedicated to the CSG cells.

To assist the search function on mixed carriers, all CSG cells on mixed carriers broadcast in system information a range of physical cell identity (PCI) values reserved by the network for use by CSG cells. Optionally also non-CSG cells on the mixed carrier can send this information in the system information. The reserved PCI range is only applicable to the frequency of a public land mobile network (PLMN) where the UE received this information. The UE considers the last received reserved range of PCI values for the CSG cells to be valid for a maximum of 24 hours within the entire PLMN. UE's use of the received PCI split information is a UE implementation dependent.

The UE checks the suitability of the CSG cells (identified by the 1 bit indicator) based on the CSG whitelist in the UE (provided by upper layers). A CSG cell is only suitable for a UE if it belongs to its CSG whitelist.

The automated searching for the CSG cells by the UE shall be disabled by the search function, if the CSG whitelist configured in the UE is empty.

In addition, manual selection of the CSG cells is supported.

A cell selection/reselection to the CSG cells does not require the network to provide neighbor cell information to the UE. The neighbor cell information can be provided to help the UE in specific cases, e.g. where the network wishes to trigger the UE to search for the CSG cells.

A cell reselection between allowed CSG cells is based on normal cell reselection procedure.

An inbound mobility to CSG cells when a UE is in RRC_CONNECTED is described.

While a UE is in RRC_CONNECTED, the UE performs normal measurement and mobility procedures based on a configuration provided by the network.

The UE is not required to support manual selection of CSG IDs while in RRC_CONNECTED.

Handover to home NodeB (HNB)/home eNodeB (HeNB) follows framework of UE assisted network controlled handover. Handover to a HNB/HeNB is different from the normal handover procedure in three aspects:

1. Proximity estimation: in case the UE is able to determine, using autonomous search procedures, that it is near a CSG or hybrid cell whose CSG ID is in the UE's CSG whitelist, the UE may provide to the source eNB an indication of proximity. The proximity indication may be used as follows:

If a measurement configuration is not present for the concerned frequency/radio access technology (RAT), the source eNB may configure the UE to perform measurements and reporting for the concerned frequency/RAT.

The source eNB may determine whether to perform other actions related to handover to HNB/HeNBs based on having received a proximity indication (for example, the source eNB may not configure the UE to acquire the system information of the HNB/HeNB unless it has received a proximity indication).

2. Physical scrambling code (PSC)/PCI confusion: due to the typical cell size of HNB/HeNBs being much smaller than macro cells, there can be multiple HNBs/HeNBs within the coverage of the source eNB that have the same PSC/PCI. This leads to a condition referred to as PSC/PCI confusion, wherein the source eNB is unable to determine the correct target cell for handover from the PSC/PCI included in the measurement reports from the UE. The PSC/PCI confusion is solved by the UE reporting the global cell identity of the target HNB/HeNB.

3. Access control: if the target cell is a hybrid cell, prioritization of allocated resources may be performed based on the UE's membership status. Access control is done by a two step process, where first the UE reports the membership status based on the CSG ID received from the target cell and the UE's CSG whitelist, and then the network verifies the reported status. When the UE has an emergency call, an MME allows inbound mobility to the CSG cells even if the access control fails.

FIG. 6 shows an example of mobility to HeNB's CSG and hybrid cells.

Mobility from eNB/HeNB to a HeNB's CSG/hybrid cell takes place with an S1 handover procedure. In the following call flow, the source cell can be an eNB or a HeNB. In addition, the procedure applies to any scenario where the CSG ID is provided by the UE or provided by the source eNB.

1. The source eNB configures the UE with proximity indication control.
2. The UE sends an entering proximity indication when it determines it may be near a cell (based on autonomous search procedures) whose CSG ID is in the UE's CSG whitelist. The proximity indication includes the RAT and frequency of the cell.
3. If a measurement configuration is not present for the concerned frequency/RAT, the source eNB configures the UE with relevant measurement configuration including measurement gaps as needed, so that the UE can perform measurements on the reported RAT and frequency. The network may also use the proximity indication to minimize the requesting of handover preparation information of CSG/hybrid cells by avoiding requesting such information when the UE is not in the geographical area where cells whose CSG IDs are in the UEs CSG White-list are located.
4. The UE sends a measurement report including the PCI (e.g., due to triggered event A3).
5. The source eNB configures the UE to perform SI acquisition and reporting of a particular PCI.
6. The UE performs SI acquisition using autonomous gaps, i.e., the UE may suspend reception and transmission with the source eNB within the limits to acquire the relevant system information from the target HeNB.
7. The UE sends a measurement report including (E-)CGI, TAI, CSG ID and "member/non-member" indication.
8. The source eNB includes the target E-CGI and the CSG ID in the handover required message sent to the MME. If the target is a hybrid cell, the cell access mode of the target is included.
9. The MME performs UE access control to the CSG cell based on the CSG ID received in the handover required message and the stored CSG subscription data for the UE. If the access control procedure fails, the MME ends the handover procedure by replying with the handover preparation failure message. If the cell access mode is present, the MME determines the CSG membership status of the UE handing over to the hybrid cell and includes it in the handover request message.
10-11. The MME sends the handover request message to the target HeNB including the target CSG ID received in the handover required message. If the target is a hybrid cell, the CSG membership status will be included in the handover request message.

12. The target HeNB verifies that the CSG ID received in the handover request message matches the CSG ID broadcast in the target cell and if such validation is successful it allocates appropriate resources. UE prioritization may also be applied if the CSG membership status indicates that the UE is a member.

13-14. The target HeNB sends the handover request acknowledge message to the MME via the HeNB GW if present.

15. The MME sends the handover command message to the source eNB.

16. The source eNB transmits the handover command (RRC connection reconfiguration message including mobility control information) to the UE.

After sending the entering proximity indication (step 2), if the UE determines that it is no longer near a cell whose CSG ID is in the UE's CSG whitelist, the UE sends a leaving proximity indication to the source eNB. Upon reception of this indication, the source eNB may reconfigure the UE to stop measurements on the reported RAT and frequency.

In the above procedure, steps 2 and 3 may not be performed in case the UE has not previously visited the HeNB, e.g., when the UE first visits a hybrid cell.

The PCI confusion is resolved by steps 5, 6 and 7. The source eNB can request SI acquisition and reporting for any PCI, not limited to PSCs/PCIs of CSG or hybrid cells.

An outbound mobility to CSG cells is described. It may refer to a section 10.5.2 of 3GPP TS 36.300 V10.5.0 (2011-09). For a UE leaving a CSG cell in RRC_IDLE, normal cell reselection based on configuration from the BCCH of the CSG cell applies. For a UE leaving a CSG cell in RRC_CONNECTED, normal network controlled mobility applies.

A proximity indication is described. As described above, the proximity indication is to indicate that the UE is entering or leaving the proximity of one or more CSG member cells. The detection of proximity is based on an autonomous search function.

FIG. 7 shows an example of a proximity indication procedure.

Referring to FIG. 7, at step S50, the UE and the E-UTRAN perform an RRC connection reconfiguration procedure. At step S60, the UE transmit a proximity indication to the E-UTRAN.

A UE in RRC_CONNECTED may perform as follows:
1> if the UE enters the proximity of one or more CSG member cell(s) on an E-UTRA frequency while proximity indication is enabled for such E-UTRA cells; or
1> if the UE enters the proximity of one or more CSG member cell(s) on an UTRA frequency while proximity indication is enabled for such UTRA cells; or
1> if the UE leaves the proximity of all CSG member cell(s) on an E-UTRA frequency while proximity indication is enabled for such E-UTRA cells; or
1> if the UE leaves the proximity of all CSG member cell(s) on an UTRA frequency while proximity indication is enabled for such UTRA cells:
2> if the UE has previously not transmitted a ProximityIndication for the RAT and frequency during the current RRC connection, or if more than 5 s has elapsed since the UE has last transmitted a ProximityIndication (either entering or leaving) for the RAT and frequency:
3> initiate transmission of the ProximityIndication message;
The UE shall set the contents of ProximityIndication message as follows:

1> if the UE applies the procedure to report entering the proximity of CSG member cell(s):
2> set type to entering;
1> else if the UE applies the procedure to report leaving the proximity of CSG member cell(s):
2> set type to leaving;
1> if the proximity indication was triggered for one or more CSG member cell(s) on an E-UTRA frequency:
2> set the carrierFreq to eutra with the value set to the E-ARFCN value of the E-UTRA cell(s) for which proximity indication was triggered;
1> else if the proximity indication was triggered for one or more CSG member cell(s) on a UTRA frequency:
2> set the carrierFreq to utra with the value set to the ARFCN value of the UTRA cell(s) for which proximity indication was triggered;

The UE shall submit the ProximityIndication message to lower layers for transmission.

In-device coexistence (IDC) interference will be described.

In order to allow users to access various networks and services ubiquitously, an increasing number of UEs are equipped with multiple radio transceivers. For example, a UE may be equipped with LTE, Wi-Fi, Bluetooth transceivers, and global navigation satellite system (GNSS) receivers. One resulting challenge lies in trying to avoid coexistence interference between those collocated radio transceivers.

FIG. 8 shows an example of coexistence interference within the same UE.

A LTE module 70 includes a LTE baseband 71 and a LTE radio frequency (RF) 72. A GPS module 80 includes a GPS baseband 81 and a GPS RF 82. A Bluetooth/Wi-Fi module 90 includes a Bluetooth/Wi-Fi baseband 91 and a Bluetooth/Wi-Fi RF 92.

Due to extreme proximity of multiple radio transceivers within the same UE, the transmit power of one transmitter may be much higher than the received power level of another receiver. Accordingly, different RATs within the same UE operating on adjacent frequencies causes interference to each other. For example, if all of the LTE module 70, the GPS module 80 and the Bluetooth/Wi-Fi module 90 are switched on, the LTE module 70 may interfere the GPS module 80 and the Bluetooth/Wi-Fi module 90. Or the Bluetooth/Wi-Fi module 90 may interfere the LTE module 70. The LTE module 70 can measure the IDC interference by cooperating with other radio modules or by inter/intra frequency measurements.

Coexistence scenarios are due to adjacent frequencies between different radio technologies. To describe coexistence interference scenarios between LTE radio and other radio technologies, 3GPP frequency bands around 2.4 GHz industrial, scientific and medical (ISM) bands are considered.

FIG. 9 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

The transmitter of LTE band 7/13/14 may cause interference to the receiver of GNSS at 1575.42 MHz.

When a UE enters a proximity of a CSG cell on a frequency, the UE transmits a proximity indication indicating the frequency and entering to a serving eNB. However, it is not clear whether or not the UE should move to the CSG cell in case that interference is expected or ongoing on the frequency. If the eNB moves the UE to the CSG member cell, the UE may experience the interference, so that a radio link failure (RLF) might occur on the CSG cell.

In addition, when the UE is served by the CSG cell on a frequency currently, interference may be expected or ongoing on the frequency. Or, the UE may be interested in a specific service. In this case, the UE may not prefer the current serving CSG cell. Therefore, a method for performing a handover from the current serving CSG cell when the UE does not prefer the current serving CSG cell may be required.

FIG. 10 shows an example of a method for transmitting a message according to an embodiment of the present invention. Referring to FIG. 10, a UE in RRC_CONNECTED is connected to a CSG cell as a serving cell currently. The UE is a member of the CSG cell, so that the UE is allowed to access to the CSG cell.

When the UE likes to leave the CSG cell to move to a neighbor cell at step S100, the UE transmits a proximity indication to the CSG cell at step S110. The proximity indication may indicate one of entering, leaving, and leaving the serving cell. In FIG. 10, the proximity indication indicates leaving the CSG cell. Also, the proximity indication may include a cause. In FIG. 10, the cause indicates the CSG cell. At step S120, if a HeNB controlling the CSG cell receives the proximity indication, the HeNB may perform handover of the UE to the neighbor cell.

FIG. 11 shows another example of a method for transmitting a message according to an embodiment of the present invention. Referring to FIG. 11, a UE in RRC_CONNECTED is connected to a CSG cell as a serving cell currently. The UE is a member of the CSG cell, so that the UE is allowed to access to the CSG cell.

When the UE detects IDC interference on a serving frequency of the CSG cell, so that the UE is hard to receive transmissions from the CSG cell, at step S200, the UE transmits a proximity indication to the CSG cell at step S210. The proximity indication may indicate one of entering, leaving, and leaving the serving cell. In FIG. 11, the proximity indication indicates leaving the CSG cell. Also, the proximity indication may include a cause. In FIG. 11, the cause indicates the IDC interference. The proximity indication may also include IDC-related information. At step S220, if a HeNB controlling the CSG cell receives the proximity indication, the HeNB may perform handover of the UE to the neighbor cell.

FIG. 12 shows another example of a method for transmitting a message according to an embodiment of the present invention. Referring to FIG. 12, a UE in RRC_CONNECTED is connected to a CSG cell as a serving cell currently. The UE is a member of the CSG cell, so that the UE is allowed to access to the CSG cell.

When the UE becomes interested in an MBMS service broadcast from another cell at step S300, the UE transmits a proximity indication to the CSG cell at step S310. The proximity indication may indicate one of entering, leaving, and leaving the serving cell. In FIG. 12, the proximity indication indicates leaving the CSG cell. Also, the proximity indication may include a cause. In FIG. 12, the cause indicates the MBMS service. The proximity indication may also include MBMS-related information. At step S320, if a HeNB controlling the CSG cell receives the proximity indication, the HeNB may perform handover of the UE to the neighbor cell which carries the MBMS service on the other frequency than a serving frequency.

Even though the UE transmits the message due to the interest in the MBMS service in FIG. 12, an embodiment of the present invention is not limited to the MBMS service. The UE may transmit a message when the UE becomes interested in a voice service from another cell.

FIG. 13 shows another example of a method for transmitting a message according to an embodiment of the present invention. Referring to FIG. 13, a UE in RRC_CONNECTED is connected to a CSG cell as a serving cell currently. The UE is a member of the CSG cell, so that the UE is allowed to access to the CSG cell.

When the UE prefers another CSG cell to the current serving CSG cell at step S400, the UE transmits a proximity indication to the serving CSG cell at step S410. The proximity indication may indicate one of entering, leaving, and leaving the serving cell. In FIG. 13, the proximity indication indicates leaving the serving CSG cell. Also, the proximity indication may include a cause. In FIG. 13, the cause indicates the another CSG cell. The proximity indication may also include CSG-related information. At step S420, if a HeNB controlling the CSG cell receives the proximity indication, the HeNB may perform handover of the UE to the neighbor CSG cell.

FIG. 14 shows another example of a method for transmitting a message according to an embodiment of the present invention. FIG. 14 shows transmission of a proximity indication in case that a CSG cell has a lower priority than IDC interference.

At step S500, a UE determines it may be near a cell (based on autonomous search procedures) whose CSG ID is in the UE's CSG whitelist.

At step S510, the UE transmits a proximity indication indicating that the UE enters a proximity of the CSG cell to the network when it determines it may be near a cell (based on autonomous search procedures) whose CSG ID is in the UE's CSG whitelist. The proximity indication may include a radio access technology (RAT) and a frequency of the CSG cell. The UE may start a timer to prohibit transmitting another proximity indication to the network. The timer may expire after 5 seconds elapse. The UE may not be allowed to transmit any proximity indication while the timer is running.

At step S520, if the UE detects potential or ongoing IDC interference on a frequency where the CSG cell is located, the UE prioritizes between the IDC interference and the CSG cell which the UE transmits the proximity indication. Or, if UE becomes interested in an MBMS service, the UE may prioritize the MBMS service than the CSG member cell.

At step S530, in case that the UE has previously transmitted the proximity indication for the CSG cell, and if the IDC interference/MBMS service has a higher priority than the CSG cell, the UE transmits the proximity indication indicating that the UE leaves the proximity of the CSG cell. The proximity indication may include IDC-related information or the MBMS-related information. Alternatively, the UE may transmit the proximity indication indicating that the UE cancels entering the proximity of the CSG cell for the IDC interference/MBMS service. The proximity indication may include IDC-related information or the MBMS-related information.

While the timer is running, the UE cannot transmit any proximity indication. However, while the timer is running, if the UE needs to transmit the proximity indication due to either the IDC interference or the interest in the MBMS service, the UE may ignore the timer and then transmits the proximity indication.

Embodiments of the present invention describe above is not limited to the CSG cell. The CSG cell may be replaced with a small cell or a wireless local area network (WLAN). The CSG cell, the small cell, and the WLAN may be deployed similarly in that coverage of the CSG cell, the small cell, and the WLAN is relatively smaller that coverage of a macro cell. The CSG cell may be deployed sparsely in coverage of the macro cell. The small cell may be deployed densely, and may be deployed in coverage of the macro cell or out of coverage of the macro cell. The WLAN may have different interfaces from the macro cell, and may not be able to exchange information with the macro cell directly.

FIG. 15 shows another example of a method for transmitting a message according to an embodiment of the present invention.

At step S600, a UE determines that a first cell, serving the UE currently, is not preferred. Whether the first cell is not preferred may be determined based on various causes. As described above, when the UE likes to leave the first cell to move to a second cell, the first cell may not be preferred. The first cell may be a CSG cell. And, the second cell may be a CSG cell. Or, when the UE detects IDC interference on a serving frequency, the first cell may not be preferred. Or, when the UE is interested to received a preferred service provided by another cell, the first cell may not be preferred. Or, when the first cell and another cell operate in different RATs and an RAT of the first cell is not preferred, the first cell may not be preferred.

At step S610, the UE transmits a message, to the first cell, including a request for a handover from the first cell to a second cell. The message may be a proximity indication. The proximity indication may indicate one of entering, leaving, and leaving the serving cell. Also, the proximity indication may include a cause.

FIG. 16 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting a message in a wireless communication system, the method comprising:
    establishing, by a user equipment (UE), a radio resource control (RRC) connection with a first cell;
    determining, by the UE, whether a closed subscriber group identity (CSG ID) of the first cell is included in a CSG whitelist of the UE;
    if the CSG ID of the first cell is included in the CSG whitelist of the UE, transmitting, from the UE to a network, a first proximity indication indicating that the UE is entering to the first cell,
    wherein the first proximity indication includes a radio access technology (RAT) and a frequency of the first cell;
    starting, by the UE, a prohibit timer after transmitting the first proximity indication,
    wherein the prohibit timer is used to prohibit another transmission of proximity indication other than the transmission of the first proximity indication;
    detecting, by the UE, an in-device-coexistence (IDC) interference on the frequency of the first cell;
    determining, by the UE, whether the UE needs to leave the first cell based on the detected IDC interference; and
    transmitting, by the UE, a second proximity indication indicating that the UE is leaving out the first cell,
    wherein the second proximity indication includes IDC related information and a causing parameter indicating a reason for the UE leaving the first cell, and
    wherein the prohibit timer is ignored only if the second proximity indication due to the IDC interference is transmitted from the UE.

2. A user equipment (UE) for transmitting a message in a wireless communication system, the UE comprising:
    a radio frequency (RF) unit for transmitting or receiving a radio signal; and
    a processor coupled to the RF unit,
    wherein the processor is configured to:
        establish a radio resource control (RRC) connection with a first cell,
        determine whether a closed subscriber group identity (CSG ID) of the first cell is included in a CSG whitelist of the UE,
        if the CSG ID of the first cell is included in the CSG whitelist of the UE, transmit a first proximity indication indicating that the UE is entering to the first cell,
        wherein the first proximity indication includes a radio access technology (RAT) and a frequency of the first cell,
        start a prohibit timer after transmitting the first proximity indication,
        wherein the prohibit timer is used to prohibit another transmission of proximity indication other than the transmission of the first proximity indication,
        detect an in-device-coexistence (IDC) interference on the frequency of the first cell,
        determine whether the UE needs to leave the first cell based on the detected IDC interference, and
        transmit a second proximity indication indicating that the UE is leaving out the first cell,
        wherein the second proximity indication includes IDC related information and a causing parameter indicating a reason for the UE leaving the first cell, and
        wherein the prohibit timer is ignored only if the second proximity indication due to the IDC interference is transmitted from the UE.

* * * * *